US011800886B2

(12) United States Patent
Gao et al.

(10) Patent No.: US 11,800,886 B2
(45) Date of Patent: Oct. 31, 2023

(54) METHODS OF PROCESSING FOODSTUFFS WITH POLYESTER FOAM CONTROL AGENTS

(71) Applicants: Dow Global Technologies LLC, Midland, MI (US); Rohm and Haas Company, Collegeville, PA (US)

(72) Inventors: Wei Gao, Collegeville, PA (US); Tianlan Zhang, Collegeville, PA (US); Xue Chen, Manvel, TX (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 238 days.

(21) Appl. No.: 17/295,817

(22) PCT Filed: Nov. 19, 2019

(86) PCT No.: PCT/US2019/062159
§ 371 (c)(1),
(2) Date: May 20, 2021

(87) PCT Pub. No.: WO2020/106690
PCT Pub. Date: May 28, 2020

(65) Prior Publication Data
US 2022/0022507 A1 Jan. 27, 2022

Related U.S. Application Data

(60) Provisional application No. 62/770,521, filed on Nov. 21, 2018.

(51) Int. Cl.
*A23L 29/00* (2016.01)
*A23L 5/30* (2016.01)
(Continued)

(52) U.S. Cl.
CPC ............. *A23L 29/035* (2016.08); *A23L 5/30* (2016.08); *B01D 19/0404* (2013.01); *C08G 63/12* (2013.01)

(58) Field of Classification Search
CPC ..... A23L 29/035; A23L 5/30; B01D 19/0404; C08G 63/12
See application file for complete search history.

(56) References Cited

U.S. PATENT DOCUMENTS 2,920,047 A    1/1960   Hyatt et al.
2,978,335 A *  4/1961   Kidger ................ A23P 30/40
                                           426/329
(Continued)

FOREIGN PATENT DOCUMENTS

WO    2011042852 A1    4/2011

OTHER PUBLICATIONS

Kumar, A., et al. (2003) "Versatile Route to Polyol Polyesters by Lipase Catalysis", Macromolecules, 36(22):8219-8221.

*Primary Examiner* — Anthony J Weier
(74) *Attorney, Agent, or Firm* — Kagan Binder, PLLC (57) ABSTRACT

Polyesters, such as those formed using polyols and di- or tri-carboxylic acids or anhydrides or salts thereof, are used as foam control agents in foodstuff processing. The polyesters are biodegradable and biocompatible while still providing excellent foam control capacity. In addition, polyesters foam control agents of the disclosure can be used with various apparatus while avoiding forming films that otherwise affect apparatus function. The polyesters can be used at various stages during industrial processing of vegetables (e.g., potatoes and beets) and fruits.

20 Claims, 2 Drawing Sheets

(51) Int. Cl.
    *C08G 63/12*     (2006.01)
    *B01D 19/04*     (2006.01)

(56) References Cited

U.S. PATENT DOCUMENTS 5,504,202 A * 4/1996 Hutchison .............. A23D 9/013
                                                                         536/120
2003/0079761 A1   5/2003  Rich

* cited by examiner

Figure 1

METHODS OF PROCESSING FOODSTUFFS WITH POLYESTER FOAM CONTROL AGENTS

RELATED APPLICATIONS

The present Application claims priority to International Application No. PCT/US2019/062159, filed Nov. 19, 2019, which claims priority to commonly owned U.S. provisional Patent Application No. 62/770,521, filed on Nov. 21, 2018, wherein the contents of said applications are incorporated herein by reference in their entireties.

BACKGROUND

The processes for manufacturing foodstuffs occasionally cause unwanted foam generation. Mechanical methods of foam management have limited effectiveness. Instead, foam control agents are added to the manufacturing process to reduce foam generation. For food and pharma applications, traditional foam control agents include ethylene oxide-based, propylene oxide-based, and silicone-based agents. Foam control agents include foam inhibitors that prevent the formation of foam (antifoamers), and defoamers that reduce foam after it is formed.

Undesirable foam formation can occur at various processing stages during the processing of a vegetable, fruit, or plant foodstuff. For example, during industrial processing of sugar beet (such as leading to formation of sugar, syrups, and juices), foam formation can occur in processing equipment during washing, cutting, diffusing, carbonizing, and evaporation steps. Likewise, during industrial processing of potatoes, foam formation can occur in processing equipment during washing, cleaning, polishing, and cutting. Yet other processes using foodstuffs where foam control is desirable includes industrial fermentation processes, including fermentation for the producing of nutraceuticals and pharmaceuticals.

Foam control agents desirably do not have an adverse effect on the industrial processes they are used in to control foam, including adverse effects on microorganisms used in industrial fermentation of foodstuffs. Since foam control agents may in some instances become present in the end product of the foodstuff processing procedure, it is desirable that they are physiologically safe. Also, foam control agents that are present in water compositions which are disposed of are preferably biodegradable and environmentally safe. However, many conventional foam control agents used for food processing are not biodegradable.

SUMMARY

Aspects of the current invention are directed to methods for controlling foam during foodstuff processing using polyesters, food product precursor compositions including polyesters, and systems for processing foodstuffs configured for using polyesters and controlling foam formation.

In embodiments, the invention provides a method for controlling foam while processing a foodstuff using a polyester including Formula I described herein. The method includes steps of (a) forming a composition comprising a foodstuff and a polyester comprising more than one repeating unit of Formula I:

wherein $R^2$ is $-(CH_2)_z-$, or and
wherein $R^1$ is:

wherein $R^3$ comprises one or more of an ester group(s), a hydroxyl group(s), a group corresponding to repeating unit of Formula I, or a combination thereof; wherein x and z are, independently, integers in the range of 1 to 8; wherein $R^{11}$ is $-H$, $-OH$, or comprises one or more repeating unit(s) of Formula I; wherein $R^{12}$ is $-C(O)OH$, an anhydride, or a salt thereof, or comprises one or more repeating unit(s) of Formula I; and wherein n and m are, independently, integers in the range of 1 to 6; and (b) processing the composition. In the method the polyester is capable of reducing or preventing foaming during processing.

In other embodiments, the invention provides a method for controlling foam while processing a foodstuff using a polyester, the polyester made from reactants comprising a polyol and a diacid or triacid, or anhydride thereof. The method includes steps of (a) forming a composition comprising a foodstuff and a polyester, wherein the polyester is formed from reactants comprising a polyol comprising three or more carbon atoms and two or more hydroxyl groups; and a diacid, triacid, or anhydride thereof having at least four carbon atoms; and (b) processing the composition. Exemplary reactants include C3-C6 diols, polyols with three or more hydroxyl groups (triols, tetraols, pentols, and hexols) and C6-C12 diacids or anhydrides thereof, and triacids, such as citric acid. Other reactants, such as long chain fatty acids and/or long chain fatty alcohols, can optionally be used to make the polyester. Polyesters of the disclosure can have a linear or a branched structure.

In other embodiments, the invention provides a food product precursor composition, the compositing including (a) a foodstuff; and (c) a polyester of the disclosure.

In other embodiments, the invention provides system for processing a food stuff using a polyester of the disclosure. The system includes (a) a foodstuff processor capable of one or more of washing, cutting, chopping, grating, slicing, peeling, julienning, mincing, dicing, shredding, blending, pureeing, beating, liquidizing, mashing, whisking, crushing, juicing, grinding, and fermenting a foodstuff to a processed foodstuff; (b) a container configured to hold the polyester and the processed foodstuff and (c) a separator mechanism capable of separating the polyester from the processed foodstuff.

The methods, compositions, and systems that use the polyester foam control agents of the disclosure can be used for the processing of various types of plants, fruits, or vegetables, such as those that include substantial amounts of starch, such as potatoes, or substantial amounts of saponin, such as beets. Release of starch and saponin from these foodstuffs can otherwise cause formation of foam, which is controlled using the polyesters of the disclosure.

Polyester foam control agents of the disclosure provide advantages over other conventional foam control agents in that they have good biodegradability while still providing excellent foam control. The polyesters of the disclosure are formed from biocompatible reagents and therefore are beneficially used over foam control polymers that are formed from reactants that are not biocompatible (e.g., toxic or otherwise hazardous to a biological system).

DETAILED DESCRIPTION

The present disclosure describes methods, compositions, and systems for controlling foam. The methods, compositions, and systems described herein are particularly relevant to food processing applications. During food-processing foam can be generated at various points in the production process. The foam is caused by the presence of surface-active substances such as proteins, fatty acids, polysaccharides such as starch, saponins, and sugars when aeration (generated for example by mechanical agitation, mixing, washing, extraction, stirring, sparging, etc.) occurs during processing. Foam impairs the food processing process in many different ways and greatly disrupts the process flow. The methods described herein are effective in limiting the amount of foam generated in a food processing application as compared to a similar food process where the methods and polyesters described herein are not used. Without being limited by theory, it is expected that the methods of the present disclosure have features that both (1) limit the amount of foam generated in a food process (also known as anti-foam agents) and (2) minimize or eliminate generated foams (also known as defoaming agents). The food composition and the foam control agent are combined as is known in the art, for example, by mixing.

Foam control agents of the disclosure can be used at a single point in a food processing operation, or can be used at more than one point during the procedure. For example, the industrial processing of some vegetable, fruits, or plants can involve processing steps such as washing, peeling, size reduction (e.g., cutting, shredding, blending, etc.), diffusion, extraction, and fermentation. Foam control agents of the disclosure can be used in any one or more of these particular processing steps, and formulated as desired in compositions suitable for each type of processing event.

Foam control agents of the disclosure include polyesters having repeating units of Formula I as described herein, or polyesters that are formed from reaction composition that include certain polyol and diacid or triacid/anhydride components. The polyesters can be formed from biocompatible reactants and the polyesters can eventually degrade into biocompatible (degradation) products after use. A "biocompatible" material is one that does not cause an adverse effect to a biological system, such adverse effect being harmful to a whole organism of a substructure (e.g., cell) of the organism, like a toxic effect.

Polyesters of the disclosure, including those having linear and branched structures, can be synthetically prepared, such as by reaction of polyol and a diacid, triacid, or anhydride thereof. Reaction leading to polyester formation can be promoted by the presence of a lipase. Polyesters of the disclosure can be referred to as "non-natural" compounds.

Polyesters of the disclosure can include repeating units of the Formula I:

with $R^2$ being $—(CH_2)_z—$, or and with $R^1$ being:

wherein $R^3$ includes one or more of an ester group(s), hydroxyl group(s), group corresponding to repeating unit of Formula I, or combination thereof, wherein $R^{11}$ is —H, —OH, or comprises one or more repeating unit(s) of Formula I; wherein $R^{12}$ is —C(O)OH, an anhydride, or a salt thereof, or comprises one or more repeating unit(s) of Formula I; and wherein n and m are, independently, integers in the range of 1 to 6. In Formula I, x and z are, independently, integers in the range of 1 to 8. In embodiments, x is an integer in the range of 1-7, an integer in the range of 1-6, an integer in the range of 1-5, or an integer in the range of 1-4. In embodiments, x is 1, 2, 3, or 4. In further embodiments, z is an integer in the range of 2-8, an integer in the range of 3-7, or an integer in the range of 3-6. In embodiments z is z is 4, 5, 6, or 7.

For example, in polyesters of the disclosure $R^3$ can independently be selected from the group consisting of —H, —OH, —O(CO)$R^4$, —(CHR$^5$)$_y$CH$_2$R$^5$, and a group corresponding to repeating unit of Formula I. $R^4$ can be selected from hydrogen, alkyl, groups that include one or more of ester, or hydroxyl group(s), and groups corresponding to repeating unit of Formula I. $R^5$ can be independently selected from —H, —OH, and groups corresponding to repeating unit of Formula I. In —(CHR$^5$)$_y$CH$_2$R$^5$, y can be an integer in the range of 1-8. In embodiments, x is 1 or greater, and $R^3$ is —OH, which provide exemplary chemistries of $R^1$ groups such as:

If x of $R^1$ is greater than 1, e.g., an integer in the range of 2-8, $R^1$ can include two or more different $R^3$ groups with $R^3$ therein independently selected from —H, —OH, —O(CO)$R^4$, —(CHR$^5$)$_y$CH$_2$R$^5$, and groups corresponding to repeating unit of Formula I. For example $R^1$ can be:

Examples of $R^1$ groups in polyesters of the disclosure where therein $R^3$ is —(CHR$^5$)$_y$CH$_2$R$^5$ include, for example:

Examples of $R^1$ groups in polyesters of the disclosure where therein $R^3$ includes a group corresponding to one or more repeating unit(s) of Formula I include those such as:

wherein $R^1$ and $R^2$ have the meanings as described herein and wherein p is an integer that is equal to the total number of repeat units of Formula I in the polyester minus n.

In some embodiments $R^1$ includes i) one or more hydroxyl groups and one or more hydrocarbyl groups having 6 or more carbon atoms, ii) one or more hydroxyl groups and one or more groups corresponding to repeating unit of Formula I, iii) one or more hydrocarbyl groups having 6 or more carbon atoms and one or more groups corresponding to repeating unit of Formula I, and iv) one or more hydroxyl groups, one or more hydrocarbyl groups having 6 or more carbon atoms, and one or more groups corresponding to repeating unit of Formula I.

In embodiments, the hydrocarbyl groups can be aliphatic groups that are pendent from and extend from the polyester backbone and can enhance the surfactant properties of the polyester. Exemplary hydrocarbyl groups having 6 or more carbon atoms include saturated and partially saturated linear, branched, and cyclic alkyl, alkene aryl, arylene alkyl, and the like. Preferred hydrocarbyl groups have an amount of carbons in the range of 8-22, or in the range of 10-20.

Therefore, in embodiments, $R^1$ can be any one of the sub-formulas as follow:

wherein $R^9$ is independently selected from —OH, $R^{10}$, wherein $R^{10}$ includes a hydrocarbyl group having 6 or more carbon atoms, and a group corresponding to repeating unit of Formula I. In embodiments, two or more of $R^9$ are —H and at least one of $R^9$ is $R^{10}$. In embodiments, in $R^9$ there is a) one —OH and one —$R^{10}$, b) two —OH and one —$R^{10}$, c) three —OH and one —$R^{10}$, d) one —OH and one group corresponding to repeating unit(s) of Formula I, e) two —OH and one group corresponding to repeating unit(s) of Formula I, or f) three —OH and one group corresponding to repeating unit(s) of Formula I, g) one $R^{10}$ and one group corresponding to repeating unit(s) of Formula I, h) two $R^{10}$ and one group corresponding to repeating unit(s) of Formula I, or i) one —OH, one group corresponding to repeating unit(s) of Formula I, and one $R^{10}$.

In embodiments, $R^{10}$ can include a C8-C22, or C10-C20 saturated or partially saturated linear, branched, cyclic alkyl, alkene aryl, or arylene alkyl group. In some embodiments, $R^{10}$ is —O(CO)(CH$_w$)$_y$CH$_3$, wherein w is independently 1 or 2, and y is an integer in the range of 6-20, or an integer in the range of 8-18.

Exemplary hydrocarbyl groups can be formed by reacting one or more hydroxyl groups of $R^1$ of an intermediate polyester in with a C6+ saturated fatty acid, a C6+ partially saturated fatty acid, or a mixture thereof. For example, the fatty acid can be selected from saturated fatty acids include caprylic acid (octanoic acid), capric acid (decanoic acid), lauric acid (dodecanoic acid), myristic acid (tetradecanoic acid), palmitic acid (hexadecanoic acid), stearic acid (octadecanoic acid), arachidic acid (eicosanoic acid), behenic acid (docosanoic acid) and lignoceric acid (tetracosanoic acid). The fatty acid can also be a partially saturated fatty acid such as myristoleic acid (a C14 unsaturated acid); palmitoleic and sapienic acids (C16 unsaturated acid); oleic, elaidic, vaccenic, linoleic, and linolenic acids (C18 unsaturated acids); arachidonic and eicosapentaenoic acids (C20 unsaturated acids); and erucic acid (C22 unsaturated acids).

Examples of $R^1$ groups having $R^{10}$ group chemistries include:

and

In some embodiments $R^9$ is —O(CO)$R^2$(CO)O$R^6$, and $R^6$ includes one or more hydroxyl group(s). Examples of $R^1$ groups of this formula include:

wherein $R^2$ is defined as described herein.

Polyesters of the disclosure can also have a chemistry as follows:

wherein $R^1$ has the meaning described herein, wherein $R^7$ is a group comprising one or more carboxylate group(s), or a salt thereof; or one or more hydroxyl groups, hydrocarbyl group, or a combination thereof. Exemplary $R^7$ groups include those of the formula —$R^2$(CO)OX, wherein X is —H or a counterion, and those of the formula —(COH)—, wherein x is in the range of 1 to 5. Exemplary $R^7$ groups can also include hydrocarbyl groups, such as those having six or more carbon atoms, for example, those of the formula —(CH$_w$)$_y$CH$_3$, wherein w is independently 1 or 2, and y is an integer in the range of 6-20, or an integer in the range of 8-18.

In embodiments, $R^2$ groups of the polyester of formula I can be of the following formula:

wherein $R^{11}$ is —H, —OH, or comprises one or more repeating unit(s) of Formula I; wherein $R^{12}$ is —C(O)OH, an anhydride, or a salt thereof, or comprises one or more repeating unit(s) of Formula I; and wherein n and m are, independently, integers in the range of 1 to 6. $R^2$ groups having this chemistry can be derived from reaction of a triacid or anhydride thereof, such as citric acid (i.e., n and m are both 1). In embodiments, the polyester of the disclosure can have a branched structure wherein one or both of $R^{11}$ and/or $R^{12}$ include one or more repeating unit(s) of Formula I. Branched extensions from the main polyester chain can be formed by reaction of hydroxyl and/or carboxylic acid groups at the $R^{11}$ and/or $R^{12}$ positions with di- or triacids and/or polyols, respectively. In branched structures of the disclosure, the total number of repeating units of Formula I includes those in the main polyester chain and branch(es) therefrom.

The polyester can be a desired size as described by the number of repeating units of Formula I or II which are reflected by n. In embodiments, n is an integer in the range of 2-20, an integer in the range of 3-15, an integer in the range of 4-12, or an integer in the range of 5-10. The polyester can also be described by molecular weight, such as weight average molecular weight, where the polyester has a weight average molecular weight in the range of 500-50,000 g/mol, in the range of 750-10,000 g/mol, or in the range of 1000-4,000 g/mol.

Generally, polymers have weight-average molecular weight (Mw) of 1,000 Daltons or more and are polydisperse with respect to molar mass. One convenient way of measuring the "average" chain length in a polymer sample provides a quantity known as Mn, the number average molar mass. Another well-known molar mass average that can be correlated to polymer physical properties is the weight average molar mass, Mw. Mn and Mw are also commonly known as number average molecular weight and weight average molecular weight, respectively.

The weight average molecular weight ($M_w$) can be defined by the following formula:

$$M_w = \frac{\sum_i N_i M_i^2}{\sum_i N_i M_i}$$

wherein N represents the number of moles of a polymer in the sample with a mass of M, and $\Sigma_i$ is the sum of all $N_i M_i$ (species) in a preparation. The $M_i$ can be measured using common techniques, such as light scattering, ultracentrifugation, or from size exclusion chromatography (SEC, also called gel permeation chromatography, or GPC; Striegel, A. M.; Yau, W. W.; Kirkland, J. J.; Bly, D. D., *Modern Size-Exclusion Liquid Chromatography, Practice of Gel Permeation and Gel Filtration Chromatography*. 2nd ed.; John Wiley & Sons, Inc.: Hoboken, N.J., 2009, page 7). At the end of an SEC experiment, polymer molecules of different sizes are separated and their concentrations detected as a function of the retention volume. There are various ways to calibrate the SEC experiment so that a quantitative transformation of the SEC elution curve into a molar mass distribution (MMD) can be made. The most common way is to calibrate with narrow-MMD standards using their peak-position. This approach is known as peak-position or calibrate-relative calibration (Striegel, A. M.; Yau, W. W.; Kirkland, J. J.; Bly, D. D., *Modern Size-Exclusion Liquid Chromatography, Practice of Gel Permeation and Gel Filtration Chromatography.* 2nd ed.; John Wiley & Sons, Inc.: Hoboken, N.J., 2009. Page 196). For example if narrow polystyrene (PS) molecular weight standards are used for the SEC calibration, the calibration is called PS relative calibration, and the obtained molecular weight of unknown samples are called PS relative molecular weight Discussion of Mn and Mw determination using SEC can be found in, for example, Striegel, A. M.; Yau, W. W.; Kirkland, J. J.; Bly, D. D., *Modern Size-Exclusion Liquid Chromatography, Practice of Gel Permeation and Gel Filtration Chromatography.* 2nd ed.; John Wiley & Sons, Inc.: Hoboken, N.J., 2009. Discussion of $M_w$ and other terms used to define the molecular weight of polymer preparations can be found in, for example, Allcock, H. R. and Lampe, F. W. (1990) *Contemporary Polymer Chemistry*; pg 271.

Polyesters of the disclosure can also be described in terms of the materials (reactants) which are used to form the polyester. Generally, polyesters of the disclosure are formed from reactants that include, at least, a polyol and a polycarboxylic acid or reactive derivative thereof, such as a polycarboxylic anhydride. Other materials (reactants) that are reactive with polyol/hydroxyl chemistries and/or polycarboxylic acid/carboxylate chemistries, can be used to form the polyester.

In embodiments, the polyester is formed from reactants that include a polyol that includes three or more carbon atoms and two or more, or three or more hydroxyl groups; and a diacid or triacid or anhydride thereof having at least four carbon atoms.

Exemplary polyols include diols (two hydroxyl groups), triols (three hydroxyl groups), tetraols (four hydroxyl groups), pentols (five hydroxyl groups), and hexols (six hydroxyl groups), or a combination thereof. The polyol can have an equal number of hydroxyl groups to carbon atoms, or the polyol can have a different number of hydroxyl groups to carbon atoms. Polyol that have equal numbers of hydroxyl groups to carbon atoms includes 3C/3OH compounds such as glycerol; 4C/4OH compounds such erythritol and threitol; 5C/5OH compounds such as arabitol, ribitol, and xylitol; and 6C/6OH compounds such as sorbitol, mannitol, allitol, dulcitol, galactitol, and iditol. Polyols that have fewer hydroxyl groups to carbon atoms include 4C/3OH compounds such as 1,2,4 butanetriol, 5C/3OH compounds such as 1,3,5 pentanetriol; 5C/4OH compounds such as pentane 1,3,4,5 tetraol; and 6C/3OH compounds such as 1,3,6 hexanetriol. Mixtures of two or more different polyol compounds can be used.

Exemplary diacids include dicarboxylic acids and anhydrides thereof, and exemplary triacids include tricarboxylic acids and anhydrides thereof. Preferred dicarboxylic acids include C3-12 dicarboxylic acids, such as malonic acid, succinic acid, glutaric acid, adipic acid, pimelic acid, and suberic acid; anhydride derivatives can also be used. An exemplary tricarboxylic acid is citric acid.

The combination of polyol and polycarboxylic acid used to make the polyester can be described with regards to the total carbon atoms, for example, with a combination of two reactant types. For example, the polyol and the polyacid or anhydride thereof can have a total number of carbon atoms in the range of 8 to 17, in the range of 9 to 16, or in the range of 10 to 15. The combination of polyol and polycarboxylic acid can also be described in terms of the relative molar quantities of each reagent used to make the polyester. For example, the polyol and the polycarboxylic acid or anhydride thereof are used in a composition to make the polyester at a molar ratio in the range of 3:1 to 1:3, in the range of 2:1 to 1:2, in the range of 3:2 to 2:3, or in the range of 4:3 to 3:4, respectively.

The polyester can also be described in terms of the total amount of polyol and polycarboxylic acid (as compared to optional other reactants) used for synthesis. For example, in modes of synthesis, the polyol and the polycarboxylic acid or anhydride thereof are present in the composition in an amount of 75% or greater (molar) of the reactants, 80% or greater (molar) of the reactants, 90% or greater (molar) of the reactants, 95% or greater (molar) of the reactants, or 99% or greater (molar) of the reactants. If other optional reactants are present, such as those reactive with the polyol and/or polycarboxylic acid chemistries, they may be present in amount of 25% (molar) or less, 20% (molar) or less, 10% (molar) or less, 5% (molar) or less, or 1% (molar) or less.

Other optional reactants that can be used during preparation of the polyester include those reactive with the polyol and/or polycarboxylic acid chemistries, such as monofunctional fatty acids, monofunctional fatty alcohols, difunctional fatty alcohols, acid-group containing polymers or acid group containing monomers.

Examples of preferred (monofunctional) fatty alcohols include those of the formula: $HO(CH_2)_yCH_3$, wherein z is independently 1 or 2, and y is an integer in the range of 6-20, or an integer in the range of 8-18.

Examples include saturated and partially saturated fatty alcohols including, but not limited to, 1-decanol, undecanol, lauryl alcohol, tridecanol, myristyl alcohol, pentadecanol, cetyl alcohol, palmitoleyl alcohol, heptadecanol, stearyl alcohol, oleyl alcohol, nonadecanol, and eicosanol.

Examples of preferred (monofunctional) fatty acids include those of the formula $HO(O)C(CH_2)_yCH_3$, wherein z is independently 1 or 2, and y is an integer in the range of 6-20, or an integer in the range of 8-18.

Saturated fatty acids include caprylic acid (octanoic acid), capric acid (decanoic acid), lauric acid (dodecanoic acid), myristic acid (tetradecanoic acid), palmitic acid (hexadecanoic acid), stearic acid (octadecanoic acid), arachidic acid (eicosanoic acid), behenic acid, and lignoceric acid (tetracosanoic acid). Partially saturated fatty acids include myristoleic acid (a C14 unsaturated acid); palmitoleic and sapienic acids (C16 unsaturated acid); oleic, elaidic, vaccenic, linoleic, and linolenic acids (C18 unsaturated acids); arachidonic and eicosapentaenoic acids (C20 unsaturated acids); and erucic acid (C22 unsaturated acid).

Examples of alkylene diols include hexanediol, heptanediol, octanediol, nonanediol, decanediol, undecanediol, and dodecanediol, and the like.

These optional reactants can be added at a desired point during the synthesis of the polyester. In some modes of practice, the optional reactants are added near or at the end of a synthesis reaction using the polyol and polycarboxylic acid to form the polyester. As a result, the optional reactants can provide desired chemistries to the terminal ends of the polyester, or pendent chemistries from the polyester backbone. In this mode of synthesis, a "polyester intermediate" can be formed, such as one having reactive chemistries like hydroxyl and carboxylic acid groups that can further be reacted with optional reactants as described herein. Polyester intermediates can be of the general formulas as described herein, for example, those wherein $R^1$ and/or $R^{11}$ includes one or more hydroxyl groups, and/or wherein $R^{12}$ is —C(O) OH, an anhydride, or a salt thereof.

The polyester can be formed using the polyol and polycarboxylic acid or anhydride thereof reactants to form the polyester using a desired reaction methods. In some modes of practice, the polyester is formed in the presence of a lipase, which is useful as it can circumvent the need for using protection—deprotection methods and chemistries which have otherwise been employed to prevent crosslinking between polyol units. Regioselective esterification reactions can be performed at low to moderate temperatures using lipases and proteases. In other modes of practice, use of a lipase can be optional, such as when a polyol is reacted with a di- or triacid (or anhydride thereof).

In some modes of practice, the polyester can be formed by providing the polyol and polycarboxylic acid components in a liquid form, such as by heating the components, and then reacting in the presence of a lipase. Exemplary reaction temperatures are in the range of 40 to 120° C., or in the range of 70 to 90° C. Exemplary reaction times are in the range of 1 hour to 96 hours, or in the range of 4 hour to 24 hours. Exemplary polyester synthesis methods are described herein as well as in publications such as Kumar, A., et al. (2003) Versatile Route to Polyol Polyesters by Lipase Catalysis, Macromolecules, 36:8219-8221. The lipase reaction can be terminated, and the formed polymer can be purified by membrane filtration, phase separation, and evaporation.

Polyester synthesis can be carried out using a single stage reaction/polymerization, or a multi-stage reaction/polymerization. For example, a single stage reaction/polymerization can be carried out using at least the polyol and di- or triacid (or anhydride thereof) reactants, and optionally a monofunctional fatty alcohol and/or a monofunctional fatty acid reactant(s). A multi-stage reaction/polymerization can be carried out using the polyol and di- or triacid (or anhydride thereof) reactants in a first stage reaction/polymerization, and then other reactants, such as a monofunctional fatty alcohol and/or a monofunctional fatty acid reactant(s) in a second stage reaction/polymerization. Use of a lipase can be optional in the first stage, but preferred in the second stage. The polyester foam control agent of the disclosure can be in a form configured to be added to a composition that includes a foodstuff or a product derived from a foodstuff product. For example, the polyester foam control agent can be in the form of a solids composition, such as in powder or granule form that is added to an aqueous composition that includes the foodstuff or a product derived therefrom. Alternatively, the foam control agent can be in a liquid composition, such as a liquid concentrate, which can be added to an aqueous composition that includes the foodstuff. Such composition forms can be "stock" or "concentrated" compositions that, when a desired amount is added to a composition that includes the foodstuff, provides the polyester foam control agent in a working amount.

A stock or concentrated liquid composition can further include a solvent, a surfactant, an emulsifier, or a combination thereof. The polyester can be in a dissolved or suspended form in such a liquid composition. An optional surfactant or emulsifier can be in an amount in the range of 0.1-30% by weight of the composition.

Exemplary optional surfactant(s) or emulsifier(s) are anionic, cationic and nonionic compounds. Examples of suitable anionic surfactants or emulsifiers are alkali metal, ammonium and amine soaps; the fatty acid part of such soaps contains preferably at least 16 carbon atoms. The soaps can also be formed "in situ"; in other words, a fatty acid can be added to the oil phase and an alkaline material to the aqueous phase.

Other examples of suitable anionic surfactants or emulsifiers are alkali metal salts of alkyl-aryl sulfonic acids, sodium dialkyl sulfosuccinate, sulfated or sulfonated oils, e.g., sulfated castor oil; sulfonated tallow, and alkali salts of short chain petroleum sulfonic acids.

Suitable cationic surfactants or emulsifiers are salts of long chain primary, secondary or tertiary amines, such as oleylamide acetate, cetylamine acetate, di-dodecylamine lactate, the acetate of aminoethyl-aminoethyl stearamide, dilauroyl triethylene tetramine diacetate, 1-aminoethyl-2-heptadecenyl imidazoline acetate; and quaternary salts, such as cetylpyridinium bromide, hexadecyl ethyl morpholinium chloride, and diethyl di-dodecyl ammonium chloride.

Examples of suitable nonionic surfactants or emulsifiers are condensation products of higher fatty alcohols with ethylene oxide, such as the reaction product of oleyl alcohol with 10 ethylene oxide units; condensation products of alkylphenols with ethylene oxide, such as the reaction product of isoctylphenol with 12 ethylene oxide units; condensation products of higher fatty acid amides with 5, or more, ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethyleneglycol monobehenate, tricosaethyleneglycol dibehenate, polyhydric alcohol partial higher fatty acid esters such as sorbitan tristearate, ethylene oxide condensation products of polyhydric alcohol partial higher fatty acid esters, and their inner anhydrides (mannitol-anhydride, called Mannitan, and sorbitol-anhydride, called Sorbitan), such as glycerol monopalmitate reacted with 10 molecules of ethylene oxide, pentaerythritol monooleate reacted with 12 molecules of ethylene oxide, sorbitan monostearate reacted with 10-15 molecules of ethylene oxide, mannitan monopalmitate reacted with 10-15 molecules of ethylene oxide; long chain polyglycols in which one hydroxyl group is esterified with a higher fatty acid and other hydroxyl group is etherified with a low molecular alcohol, such as methoxypolyethylene glycol 550 monostearate (550 meaning the average molecular weight of the polyglycol ether). A combination of two or more of these surfactants may be used; e.g., a cationic may be blended with a nonionic or an anionic with a nonionic.

The foam control agent composition can optionally include one or more additive(s). Examples of additives include ethylene oxide/propylene oxide block copolymers, butylene oxide/propylene oxide block copolymers, ethylene oxide/butylene oxide block copolymers, waxes, and silicone-based materials.

The foam control agent composition can optionally include one or more secondary foam control compounds that are used in conjunction with the methods, compositions, or systems that include the polyester foam control agent. Optional secondary foam control agents that are different than the polyester foam control agents of the disclosure include one or more agents produced by the alkoxylation of alcohol(s); at least one alkyl polyglucoside (APG); foam control agents described in one or more of Assignee's co-pending International Publication No. WO 2019/177726 published Sep. 19, 2019, in the name(s) of Xue Chen, et al.; International Publication No. WO 2019/178306 published Sep. 19, 2019, in the name(s) of Michael L. Tulchinsky, et al.; International Publication No. WO 2019/177727 published Sep. 19, 2019, in the name(s) of Clark H. Cummins;

and International Publication No. WO 2019/178306 published Sep. 19, 2019, in the name(s) of Stephen W. King, et al.; the disclosures of these applications incorporated herein. Other optional secondary foam control agents that are different than the polyester foam control agents of the disclosure also include foam control agents described in Assignee's co-pending U.S. Provisional Patent Applications filed concurrently herewith and that are identified as U.S. Provisional Application titled CYCLIC KETAL COMPOUNDS HAVING LONG SIDE CHAINS USEFUL AS FOAM CONTROL AGENTS IN THE MANUFACTURE OF FOOD AND BEVERAGE PRODUCTS, co-pending U.S. patent application Ser. No. 16/585,514, filed Sep. 27, 2019, in the names of Xue Chen, et al., and International Application No PCT/US19/51424, filed Sep. 17, 2019, titled ALKYL ETHER AMINE FOAM CONTROL COMPOUNDS AND METHODS OF PROCESSING FOODSTUFFS, both disclosures incorporated herewith in their entireties. These optional secondary foam control agents can be used in the same composition along with the polyester food control agent of the disclosure at one or more points in a food processing operation, or can be used at one or more different points in a multi-step food processing operation. That is, for example, a different secondary foam control agent can be used in an upstream processing step (such as washing of a vegetable), whereas the polyester food control agent is used in a downstream processing step (e.g., diffusion of sugar from a vegetable pulp).

In modes of practice, the polyester foam control agent is added to water to form an aqueous composition, wherein the aqueous composition is used with a foodstuff in one or more foodstuff processing steps to control any foam that may be generated as a result of the foodstuff and the processing conditions being used. The polyester foam control agent can be used in any concentration, such as in the range of 0.01 to 5% (wt), or 0.1 to 1% (wt), as described herein, to control foam formation during processing. One or more other reagents can be present in the aqueous composition along with the polyester, depending on the particular type of foodstuff processing that is being performed.

Aspects of the disclosure can optionally be described with reference to the ability of the polyester food control agent to control foam in a composition in a processing step as compared to a composition that does not include a foam control agent, or a composition that uses a comparative compound. In an exemplary testing process, a foodstuff (such as a sugar beet) is processed (such as by blending) in an aqueous composition that includes the polyester foam control agent, and an amount of foam generated is measured, such as by measuring foam volume and/or foam amount (mass). This is then compared to foam generated under the same processing conditions but either using no foam control agent, or using a comparative compound. Use of the polyester foam control agent can reduce the amount of foam formation by at least about 10%, or by at least about 20%, such as in the range of about 10% to about 95%, or about 20% to about 95%, as compared to a composition that does not include a foam control agent.

As used herein, a "foodstuff" refers to material that is edible or drinkable, or a material that can be processed into an edible or drinkable material. A foodstuff generally is used to refer to any material that is used in combination with a composition that includes the polyester foam control agent.

An "intermediate foodstuff" or a "precursor foodstuff" can refer to a foodstuff that is processed in a first step using a composition that includes the polyester foam control agent, but that is subjected to further processing in a second step, wherein the second step is another processing step that either produces an edible or drinkable food product, or a precursor thereof. An example of an intermediate or precursor foodstuff is a peeled potato which is peeled in the presence of the foam control agent, wherein the peeled potato is used in a second processing step that involves cutting or grating the potato into edible portions such as French fry portions, or potato flakes, and these further processed portions can be considered "food products." An "ingredient foodstuff," which can also be an intermediate or precursor foodstuff, refers to a foodstuff that is processed from a composition that includes the polyester foam control agent, and that is subsequently used in a foodstuff product, such as a food or beverage product. An example of an ingredient foodstuff can be sugar, such as from a sugar beet obtained using methods of the disclosure. However, sugar, such as packaged for direct consumption, can also be a food product per se. Sugar and starch foodstuffs obtained using methods of the disclosure can also be used in fermentation methods such as to provide fermented products such as fermented beverages, biofuels, and pharmaceuticals, which can be referred to herein as "foodstuff derivatives," which may or may not be edible or drinkable food products.

Foodstuffs include, but are not limited to, edible plants, vegetables, fruits, and grains, and derivatives of edible plants, vegetables, fruits, and grains that are formed when these foods are subject to processing using methods of the disclosure.

Some foodstuffs that are commonly subject to processing include plants, vegetables, and fruits that have starch. Methods of the disclosure can be used to process plants, vegetables, and fruits include those having a starch content of greater than 0.01% (wt), greater than 0.1% (wt), or greater than 1.0% (wt).

Some foodstuffs that can be processed according to methods of the disclosure include starch in an amount in the range of 0.01% to 30% wt, non-starch carbohydrate in an amount in the range of 0.01% to 80% wt, protein in an amount in the range of 0.01% to 20% wt, and water in an amount in the range of 20% to 95% wt.

Higher starch content plants, vegetables, and fruits can have starch contents of greater than 2.5% (wt), about 5% (wt) or greater, about 7.5% (wt) or greater, or even about 10% (wt) or greater, such as in the range of about 5% to about 25% (wt), or about 10% to about 25% (wt). Use of the polyester food control agent of the disclosure can be useful for controlling foam during the processing of these plants, vegetables, and fruits, which can release starch into an aqueous processing composition and otherwise cause undesirable foam formation.

Various plants, vegetables, and fruits have high starch content, and can be used in methods of the disclosure along with the polyester foam control agent. For example, in some modes of practice, the starch-containing foodstuff is, or is derived from, a vegetable or plant selected from the group consisting of peas, corn, potatoes, beans, rice, wheat, cassava, beans, sweet potatoes, yams, sorghum, and plantain.

High-content starch foodstuffs may also be defined in terms of other components that constitute the food. For example, methods of the disclosure can also use a plant, vegetable, or fruits comprises starch in an amount in the range of 5% to 25% wt, non-starch carbohydrate in an amount in the range of 0.01% to 10% wt, protein in an amount in the range of 0.01% to 10% wt, and water in an amount in the range of 50% to 95% wt, or starch in an amount in the range of 10% to 20% wt, non-starch carbohydrate in an amount in the range of 0.1% to 5% wt, protein in an amount in the range of 0.1% to 5% wt, and water in an amount in the range of 70% to 90% wt.

Some foodstuffs that are commonly subject to processing include plants, vegetables, and fruits that have saponin. Saponins are chemically defined as amphipathic glycosides structurally having one or more hydrophilic glycoside moieties attached to a lipophilic triterpene moiety. Use of the polyester food control agent of the disclosure can be useful for controlling foam during the processing of these plants, vegetables, and fruits, which can release saponin into an aqueous processing composition and otherwise cause undesirable foam formation. Methods of the disclosure can be used to process plants, vegetables, and fruits include those having a saponin content of greater than 1 ppm. High saponin content plants, vegetables, and fruits include those having a saponin content of greater than 0.001% (wt) (10 ppm), about 0.005% (wt) (50 ppm) or greater, or about 0.01% (wt) (100 ppm) or greater, such as in the range of about 0.005% (wt) to about 0.2% (wt), or such as in the range of about 0.01% (wt) to about 0.2% (wt). Saponins are reported to be found in sugar beet at levels of 0.01% to 0.2% of beet. (See, for example, Hallanoro, H., et al. (1990). Saponin, a cause of foaming problems in beet sugar production and use. *Proc. Conf. Sugar Proc. Res.*, pp. 174-203; Roberts, E. J., Clarke, M. A., and Godshall, M. A., Sugarbeet Saponins and Acid Beverage Floc. American Society of Sugar Beet Technologists: Proceedings from the 29$^{th}$ Biennial Meeting Operations, 1997, pages 39-46.)

Saponin content in various plants, vegetables, and fruits have been studied and such food stuffs can be used in methods of the disclosure along with the polyester foam control agent. For example, in some modes of practice, the saponin-containing foodstuff is, or is derived from, a vegetable or plant selected from the group consisting of peas, corn, potatoes, beans, rice, wheat, cassava, beans, sweet potatoes, yams, sorghum, and plantain.

Saponin-containing foodstuffs may also be defined in terms of other components that constitute the food. For example, methods of the disclosure can also use a plant, vegetable, or fruits comprise saponin in an amount in the range of 1 ppm to 5% wt, starch in an amount in the range of 0.01% to 30% wt, non-starch carbohydrate in an amount in the range of 0.01% to 80% wt, protein in an amount in the range of 0.01% to 20% wt, and water in an amount in the range of 20% to 95% wt.

"Foodstuff processing" refers to a physical or chemical action that treats a foodstuff. In some cases, foodstuff processing is, or includes, a cleaning or washing procedure, or a diffusing procedure. For example, foodstuff processing that uses a cleaning or washing procedure can use a composition, such as an aqueous composition, that includes the polyester foam control agent and a foodstuff, such as a plant, vegetable, or fruit, in a whole or substantially whole form. A cleaning or washing procedure can utilize a cleaning or washing apparatus, such as a tub, tank, bin, or container that is able to hold an aqueous composition having the polyester foam control agent and whole or portions of the plant, vegetable, or fruit. The cleaning or washing apparatus can further include one or more optional features such as an agitator, a mixer, or similar device to cause the movement of the plant, vegetable, or fruit therein, thereby causing cleaning by movement of the foodstuff and the aqueous composition. The cleaning or washing apparatus can further include brushes or sprayers to facilitate removal of debris, such as dirt, waxes, residues, microorganisms, or other undesirable material, from the plant, vegetable, or fruit. The cleaning or washing apparatus can further include a feature, such as a strainer, sieve, filter, grate, colander, that facilitates separation of the washed or cleaned foodstuff from the aqueous composition containing the polyester foam control agent. For example, see FIG. 9 of U.S. Pat. No. 2,838,083 (the disclosure of which is incorporated herein by reference), which describes a vegetable peeler and cleaner (e.g., for potato) having spray disperser, abrasive surface of disk 50 to remove skin of the potato, and basket or strainer 185 for potato portions.

During the cleaning or washing procedure, the polyester can prevent and/or reduce formation of foam that may otherwise result from release of components (e.g., starches, saponin) from the plant, vegetable, or fruit into the aqueous wash composition. An aqueous wash or cleaning composition can include the polyester at a desired concentration, such as in the range of 0.01 to 5% (wt), or in the range of 0.1 to 1% (wt) in the aqueous wash composition. An aqueous wash or cleaning composition can optionally include one or more other reagents such as surfactant(s), antimicrobial agents, acid(s), oxidant(s), buffer(s), etc. The aqueous wash or cleaning composition can be used in a desired amount relative to the foodstuff being washed or cleaned. For example, the aqueous wash or cleaning composition is desirably at least about 20% of the composition that includes the foodstuff and the aqueous liquid portion including polyester antifoam agent. Typically, a cleaning or washing process uses aqueous liquid portion in an amount in the range of 25-90% (wt), and a foodstuff portion in an amount in the range of 10-75% (wt). Washing can be performed for a desired period of time at a desired temperature to ensure that the foodstuff is properly cleaned and desired properties (e.g., organoleptic) of the foodstuff are maintained. Generally, during cleaning or washing procedure a foodstuff is not processed into smaller portions.

In modes of practice, following a washing or cleaning procedure, the foodstuff can be subjected to one or more other food processing procedures (e.g., "downstream procedures") that use a polyester antifoam agent. Such downstream procedures include, but are not limited to size portion processing, diffusion/extraction, blending/homogenizing, evaporation, and/or fermentation.

In some cases, foodstuff processing is, or includes, a procedure that physically reduces the size (size processing) of the foodstuff from a larger (e.g., original) size, to a plurality of smaller sizes. In some cases the plurality of smaller sizes that are formed by processing can be described with reference to the size of the pre-processed foodstuff (e.g., a whole potato or sugar beet). For example, the foodstuff, prior to processing, has an original, unprocessed, size, and processing comprises a mechanical action that reduces the original size of the foodstuff to foodstuff portions of sizes that are not less than are not less than 1%, not less than 10%, or not less than 50% of the original size. Alternatively, such processing can be described with reference to weights of the processed foodstuff, for example where the processed foodstuff portions have sizes that are not less than 1 gram, or not less than 5 grams.

Examples of processing techniques that can be used to generate processed foodstuff portions of such sizes include cutting, chopping, grating, slicing, peeling, julienning, mincing, dicing, diffusing, and shredding. Examples of portions of foodstuffs that are formed can be plant, vegetable, and fruit chunks, slices, chips, flakes, shreds, and cubes.

These types of smaller portions of foodstuffs can be made into a food product for consumption, or can be used for further downstream procedures such as diffusion/extraction, blending/homogenizing, evaporation, and/or fermentation. Foodstuff portions that are size processed can optionally be described with reference to the shape and/or size of the foodstuff portion.

Size processing of a foodstuff can utilize apparatus having one or more features that physically reduce the size of the foodstuff from a larger size to a plurality of smaller sizes. For example, the apparatus can include one or more sharp articles such as blade(s), slicer(s), chipper(s), shredder(s), and grater(s) that are capable of cutting into a plant, vegetable, or fruit to generate smaller portions. The cutting features can be used in conjunction with one or more of a tub, tank, bin, or container to hold an aqueous composition having the polyester foam control agent, which can provide the plant, vegetable, or fruit to be cut, or which can hold the cut plant, vegetable, or fruit, or both.

During size processing, the polyester can prevent and/or reduce formation of foam that may otherwise result from release of components (e.g., starches, saponin) from the plant, vegetable, or fruit into an aqueous composition used in conjunction with size processing. An aqueous composition for size processing can include the polyester at a desired concentration, such as in the range of 0.01 to 5% (wt), or in the range of 0.1 to 1% (wt). Use of the aqueous composition may beneficially reduce or prevent oxidation of the size reduced foodstuff and can also remove foodstuff-based components that are released during the size processing. Size processing can be performed for a desired period of time at a desired temperature to ensure that the foodstuff is properly cleaned and desired properties (e.g., organoleptic) of the foodstuff are maintained. Generally, during cleaning or washing procedure a foodstuff is not processed into smaller portions.

In modes of practice, following size reduction procedure, the foodstuff can be subjected to one or more other downstream procedures that use a polyester antifoam agent. Such downstream procedures include, but are not limited to, diffusion/extraction, blending/homogenizing, evaporation, and/or fermentation.

In some cases, size processing results in foodstuff portions of sizes that are very small, such as less than 1%, less than 0.1%, less than 0.01%, or less than 0.001% of the original size of the foodstuff. Exemplary processing techniques that can produce very small portions include blending, pureeing, beating, liquidizing, mashing, whisking, crushing, juicing, and grinding. Such techniques can result in food particles of very low weights, such as less than 0.1 grams, less than 10 mg, less than 1 mg, or less than 100 µg. Such techniques can also result in food particles sizes that are very small, such as less than 1 mm, less than 0.1 mm, or less than 10 µm.

Size processing of a foodstuff can utilize apparatus having one or more features that physically reduce the size of the foodstuff from a larger size to a plurality of very small sizes as described herein. For example, the apparatus can include one or more sharp articles such as blender blade(s) to generate very small food product particles. These processing features can be used in conjunction with one or more of a tub, tank, bin, or container to hold an aqueous composition having the polyester foam control agent, which can provide the plant, vegetable, or fruit to be cut, or which can hold the blended, homogenized, etc. plant, vegetable, or fruit, or both. During size processing to these very small food product particles, the polyester can prevent and/or reduce formation of foam that may otherwise result from processing step, polyester concentrations as described herein can be used in the aqueous composition. After processing, foodstuff solids can be separated from the aqueous portion using separation techniques such as filtration, decanting, centrifugation, etc.

In modes of practice, following such size reduction, the foodstuff particles can be subjected to one or more other downstream procedures that use a polyester antifoam agent. Such downstream procedures include, but are not limited to, diffusion/extraction, blending/homogenizing, evaporation, and/or fermentation.

In some cases, foodstuff processing is, or includes, a procedure that diffuses one or more component(s) from a foodstuff into an aqueous composition which also includes the polyester antifoam agent. The diffusion procedure can extract desired component(s) from a plant, such as sugars, which can be refined in a subsequent processing stage. Similar to a cleaning or washing apparatus, a diffuser apparatus can include a tub, tank, bin, or container that is able to hold an aqueous composition having the polyester foam control agent and portions of the plant, vegetable, or fruit, and also an agitator, a mixer, or similar device to cause the movement of the plant, vegetable, or fruit portion therein thereby causing cleaning by movement of the foodstuff and diffusion of the plant, vegetable, or fruit, component(s) into the aqueous composition. The process of diffusing can utilize a foodstuff that has already been processed by an upstream procedure, such as any one or more size processing procedures as described herein. That is, diffusing can use processed food stuffs ranging from larger sizes, such as chunks or slices made by cutting, to very small particles, such as made by blending. The use of foodstuff portions in the diffusing process that are smaller than the originally sized foodstuff (e.g., whole potato or beet) can improve diffusion of desired components from the food stuff to the aqueous composition that includes the foam control agent. Use of the polyester foam control agent can control the generation of foam otherwise formed during diffusion without a foam control agent. After the diffusion process is completed, the aqueous composition can be separated from the portion(s) of the foodstuff that that are not soluble in the composition.

In some cases, foodstuff processing is, or includes, a procedure that evaporates water from a composition that includes a foodstuff (such as a processed foodstuff, or product derived from a processed foodstuff such as sugar or starch) and the foam control agent. The process of evaporation can utilize a foodstuff that has already been processed by an upstream procedure, such as any one or more size processing procedures and/or diffusion procedures as described herein. For example, the composition can include a processed foodstuff or component(s) derived from the foodstuffs, such as sugar(s) or protein(s) that are obtained in a diffusion process according to the disclosure. Evaporation can use one or more physical treatment(s) such as heat or low pressure to facilitate removal of water from the aqueous composition. An evaporation apparatus can include a container that is able to hold an aqueous composition having the food product and polyester foam control agent, and features such as a vacuum and heater that are operated to cause evaporation of water from the composition. Use of the polyester foam control agent can control the generation of foam otherwise formed during evaporation without a foam control agent.

In some cases, foodstuff processing is, or includes, a procedure that ferments one or more component(s) from a foodstuff in an aqueous composition which also includes the polyester antifoam agent. The fermentation procedure can include a microorganism such as bacteria or yeast that ferments one or more compound(s) from the foodstuff, such as sugar and/or starch, to a bioproduct such as ethanol, a pharmaceutical, or an industrial chemical. The process of fermentation can utilize an intermediate or precursor foodstuff that has already been processed by an upstream procedure, such as any one or more size processing procedures, diffusion, and/or evaporation procedures as described herein. A fermentation apparatus can include features such as an impellor or agitator that causes mixing of the fermentation medium, a heater, gas supply conduit(s), etc., as commonly known in the art. Use of the polyester foam control agent can control the generation of foam otherwise formed during fermentation conditions without a foam control agent.

After fermentation, the desired bioproduct can be separated from the fermentation medium. Separation can include one or more processes such as distillation, filtration, precipitation, centrifugation, and the like. Separation can also result in the separation of the foam control agent from the desired bioproduct.

In aspects, processing the foodstuff is not a cooking process (i.e., baking, roasting, flying, grilling, etc.) which otherwise subjects the food stuff or food product to high heat.

In other aspects, the composition that includes the foodstuff and the polyester is not in the form of a dough, a flour, or a dairy product.

Figure 1:
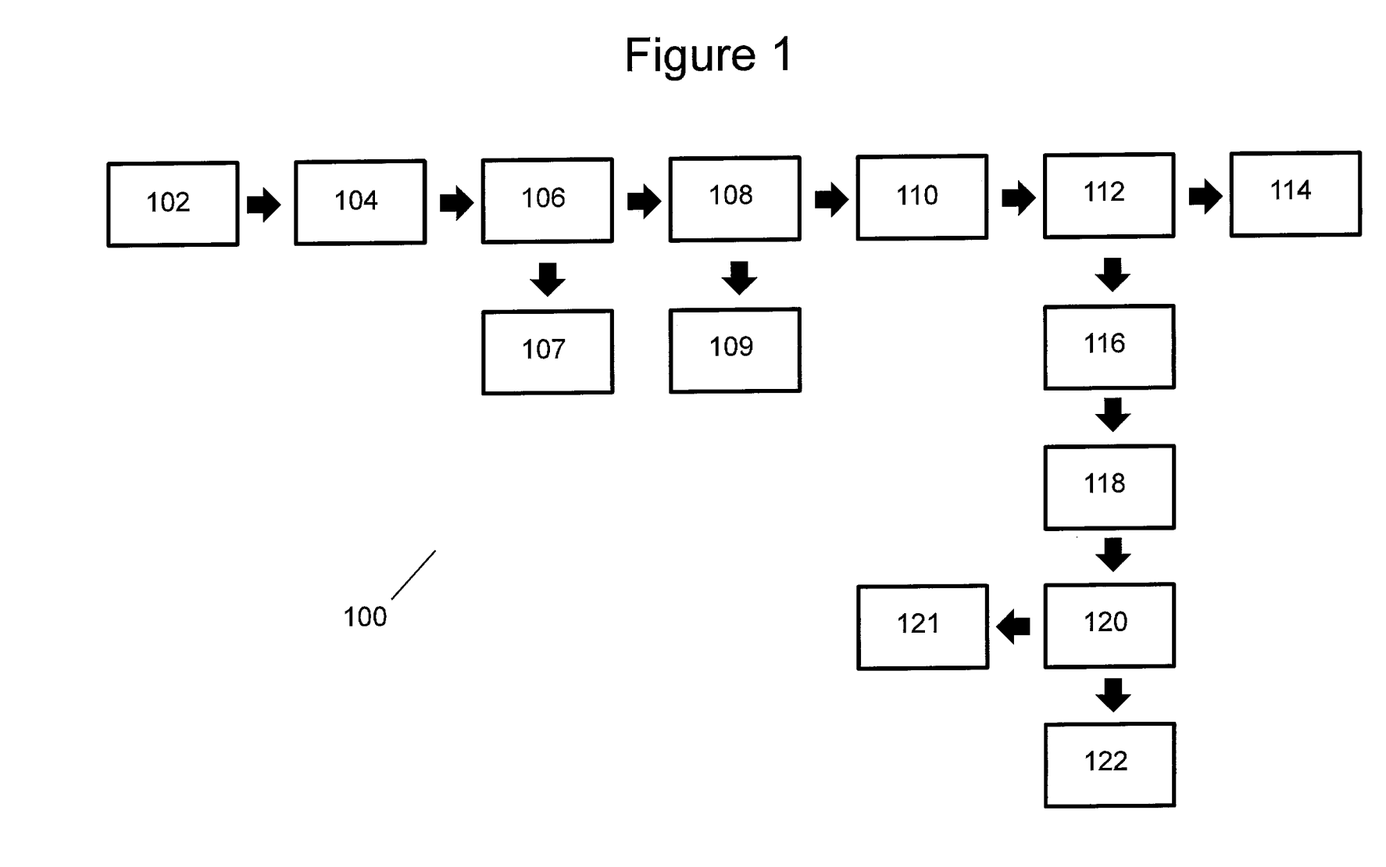
FIG. 1 is a schematic diagram illustrating steps in the industrial processing of sugar beets.

To illustrate the usefulness of the polyester foam control agent (PEFCA) in methods of processing a foodstuff, reference to FIG. 1 is made which schematically shows stages in an industrial processing 100 of a sugar beet. In stage 102 whole unprocessed beets are processed by washing in a washing tank which can include an aqueous composition with PEFCA. After washing, the washed beets are delivered to a size processing apparatus in stage 104, such as a slicing apparatus, and are size reduced in combination with an aqueous composition with PEFCA. In some cases, after size reduction the processed beet can exit the industrial processing and be used as a food product. Other size reduction steps can be included and are not shown in FIG. 1. After size reduction, the washed beets are delivered to a diffusion tank in stage 106, wherein one or more components of the beet, such as sugars, are diffused into an aqueous composition that includes the PEFCA. Remaining beet material, such as beet pulps which include fibers from the plant tissue, can be separated from the sugar-containing composition, as shown in stage 107, and the pulps can be used as animal feeds. The sugar-containing composition can then be subjected to one or more refinement steps in stage 108. Generation of refinement by-products can be used for agricultural purposes in stage 109. Refined sugar composition can be subjected to evaporation in stage 110 and PEFCA can be used to control foam in this stage as well. The evaporated sugar can be subjected to crystallization and/or centrifugation in stage 112 and sent to a dryer in in stage 114. Syrups and/or sugars can also be delivered to a fermentation pathway which can involve a pre-treatment such as dilution stage 116, and then fermentation in stage 118 which uses a fermentation medium including microorganisms and PEFCA to control foam during fermenting. The fermented medium can include one or more bioproducts which can be separated by a process such as distillation in stage 120 to PEFCA to control foam during fermenting, and then the distilled product can be subjected to steps such as dehydration or rectification in steps 121 and 122.

Figure 2:
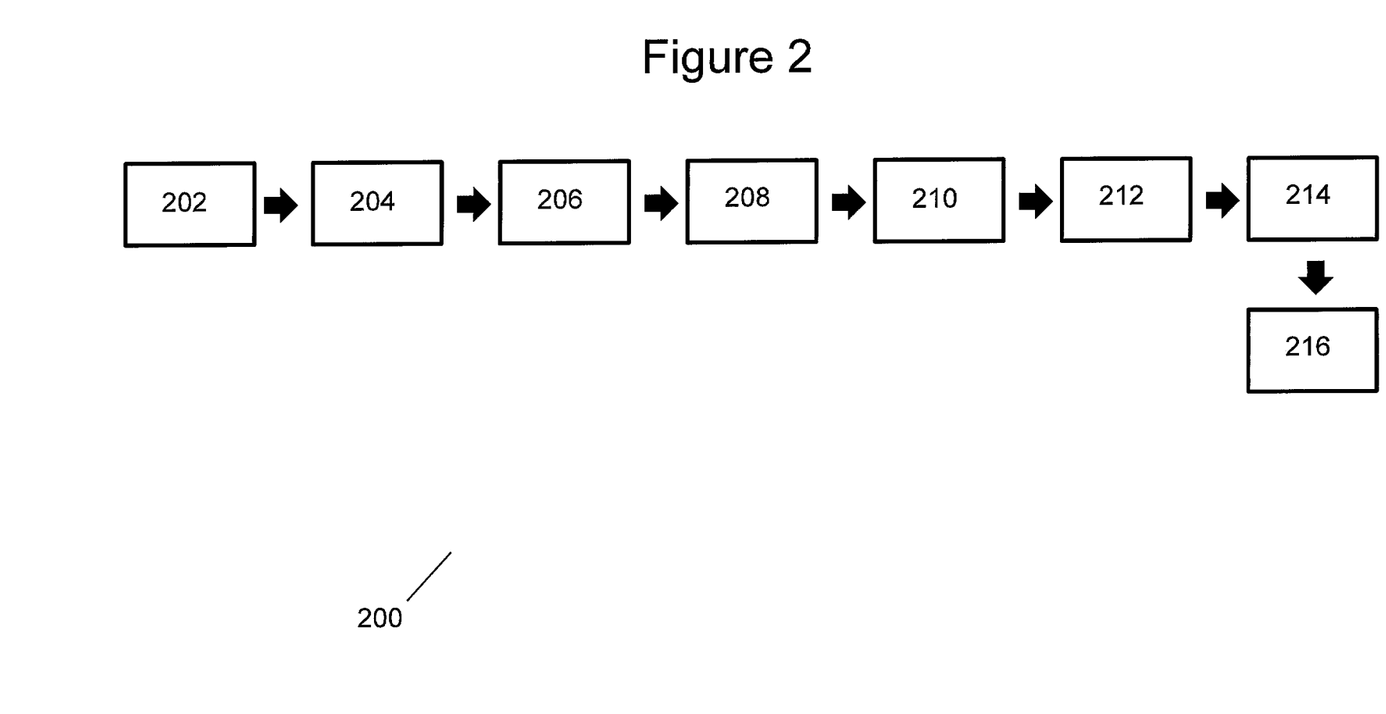
FIG. 2 is a schematic diagram illustrating steps in the industrial processing of potatoes.

As another example to illustrate the usefulness of the polyester foam control agent (PEFCA) in methods of processing a foodstuff, reference to FIG. 2 is made which schematically shows stages in an industrial processing 200 of a potato. In stage 202 whole unprocessed potatoes are processed by washing in a washing tank which can include an aqueous composition with PEFCA. Potatoes can also be sorted at this stage. After washing and sorting, the potatoes are delivered to a peeling and/or polishing apparatus in stage 204, which can be carried out in combination with an aqueous composition with PEFCA. Next, after peeling and/or polishing, the potatoes are delivered to a size reduction apparatus, such as a cutting apparatus, in stage 206, and size reduction can be carried out in combination with an aqueous composition with PEFCA. The washed, peeled, and cut potato portions can then be subjected to various other processing steps such as chilling (stages 208 and 212), spinning/drying (stage 210), and packing (stage 214), to provide a packaged product 216.

Example 1: Poly(Sorbityl Adipate)

13.6628 g sorbitol and 7.307 g adipic acid were weighed and added into a 300 mL round-bottom flask. A magnetic stir bar was added into the flask, and the flask was purged with $N_2$ for 10 min. The mixture with stir at low speed was heated to melt the solids but not over 120° C. After the melted mixture being mixed well, the flask temperature was reduced to 80° C., and pre-dried Novoxzyme-435 beads 2 g were added into the flask to start the reaction. The reaction flask was maintained at desired reaction temperature (80° C.) with stirring under atmospheric pressure till the mixture become a monophasic liquid with dispersed Novozyme 435 beads. The mixture was continuously maintained at 80° C. with magnetic stirring, and house vacuum was slowly applied while $N_2$ was slowly purged to remove the water generated from the condensation reaction. Reaction lasted about 16 hours and terminated when there was no more water fine droplet was formed. The reaction was then terminated by adding excess amount (~50 mL) of anhydrous tert-amyl alcohol and stirring for ~10 min. When the mixture was still hot, the enzyme was then removed by filtration using 200 μm filter bag to obtain the product in solution. After the product solution cooled to room temperature, two layers were formed. The upper layer was collected and concentrated by removing the solvent using Genevac evaporator to obtain the final product.

Example 2: Poly(Glyceryl Adipate)

0.5558 g glycerol and 1.3155 g adipic acid were weighed and added into a one ounce glass vial. 10 mL tert-amyl alcohol and 0.2 g Novozyme 435 were added into the vial. The vial was then heated with a cap on but not tied in shaker (PL-SP 260 VS) at 80° C. with 90 rpm agitation speed. Reaction was conducted at 80 C for 24 hours. After reaction, the enzyme was then removed by filtration using 200 μm filter bag to obtain the product in solution. The solvent in the product solution was evaporated using Genevac evaporator to obtain the final product.

Example 3: Poly(Glyceryl Adipate)

5.5254 g glycerol and 13.1526 g adipic acid were weighed and added into a 300 mL round-bottom flask. A magnetic stir bar was added afterwards into the flask that was purged with $N_2$ for 10 min. The mixture was heated with stir at low speed to melt the solids but not over 120° C. After the melted mixture being mixed well, the flask temperature was reduced to 80° C., and 2 g of pre-dried Novoxzyme-435 beads were added into the flask to start the reaction. The reaction flask were maintained at desired reaction temperature (80° C.) with stirring under atmospheric pressure till the mixture became a monophasic liquid with dispersed Novozyme 435 beads. The mixture was continuously kept at 80° C. with magnetic stirring, and house vacuum was slowly applied while $N_2$ was slowly purged to remove the water generated from the condensation reaction. The reaction lasted for about 16 hours till no more water fine droplet was formed. The reaction was terminated by adding excess amount (~50 mL) of anhydrous tert-amyl alcohol and stirring for ~10 min. the enzyme was removed, while the mixture was still hot, by filtration using 200 μm filter bag to obtain the product in solution. After the product solution cooled to room temperature, two layers were formed. The bottom layer was collected and the solvent was evaporated using Genevac evaporator. After majority of the solvent are evaporated, the sample become phase separated. The upper liquid phase was collected as the final product for characterization and application test.

Example 4: Poly(Glyceryl Adipate)

5.5254 g glycerol and 13.1526 g adipic acid were weighed and added into a 300 mL round-bottom flask and a magnetic stir bar was added into the flask which was purged with $N_2$ for 10 min. The mixture with stir at low speed was heated to melt the solids but not over 120° C. After the melted mixture being mixed well, the flask temperature was reduced to 80° C., and 2 g of pre-dried Novoxzyme-435 beads were added into the flask to start the reaction. The reaction flask was maintained at desired reaction temperature (80° C.) with stirring under atmospheric pressure till the mixture became a monophasic liquid with dispersed Novozyme 435 beads. The mixture was continuously maintained at 80° C. with magnetic stirring, and house vacuum was applied slowly while $N_2$ was slowly purged to remove the water generated from the condensation reaction. The reaction lasted for about 16 hours till no more water fine droplet was formed. The reaction was terminated by adding excess amount (~50 mL) of anhydrous tert-amyl alcohol and stirring for ~10 min. The enzyme was removed, while the mixture was still hot, by filtration using 200 μm filter bag to obtain the product in solution. After the product solution cooled to room temperature, two layers were formed. The bottom layer was collected and the solvent was evaporated using Genevac evaporator. After majority of the solvent was evaporated, the sample became phase separated, and the bottom phase was collected as the final product for characterization and application test.

Example 5: Poly(Glyceryl Adipate Palmitate)

6.9068 g glycerol and 10.9605 g adipic acid and 0.3203 g palmitic acid were weighed and added into a 300 mL round-bottom flask and a magnetic stir bar was added into the flask which was purged with $N_2$ for 10 min. The mixture with stir at low speed was heated to melt the solids but not over 120° C. After the melted mixture being mixed well, the flask temperature was reduced to 80° C., and 2 g of pre-dried Novoxzyme-435 beads were added into the flask to start the reaction. The reaction flask was maintained at desired reaction temperature (80° C.) with stirring under atmospheric pressure till the mixture became a monophasic liquid with dispersed Novozyme 435 beads. The mixture was continuously maintained at 80° C. with magnetic stirring, and house vacuum was applied slowly while $N_2$ was slowly purged to remove the water generated from the condensation reaction. The reaction lasted for about 16 hours till no more water fine droplet was formed. The reaction was terminated by adding excess amount (~50 mL) of anhydrous tert-amyl alcohol and stirring for ~10 min. The enzyme was removed, while the mixture was still hot, by filtration using 200 μm filter bag to obtain the product in solution. After the product solution cooled to room temperature, two layers were formed. The bottom layer was collected and the solvent was evaporated using Genevac evaporator to obtain the final product for characterization and application test.

Example 6: Poly(Glyceryl Adipate Palmitate)

0.4605 g glycerol, 0.9142 g adipic acid and 0.6469 g palmitic acid were weighed and added into a one ounce glass vial, and then 10 mL tert-amyl alcohol and 0.2 g Novozyme 435 were added into this vial. The vial was then heated with a cap on but not tied in shaker (PL-SP 260 VS) at 80° C. with 90 rpm agitation speed. The reaction was kept at 80° C. for 48 hours, the enzyme was removed, while the mixture was still hot, by filtration using 200 μM filter bag to obtain the product in solution. The solvent was evaporated using Genevac evaporator to obtain the final product.

Example 7: Poly(Glyceryl Adipate Palmitate)

6.90675 g glycerol, 10.9605 g adipic acid and 0.3203 g palmitic acid were weighed into a 300 mL round-bottom flask, and a magnetic stir bar was added into the flask which was purged with $N_2$ for 10 min. 50 mL tert-amyl alcohol was added into the flask, and the flask was then purged with $N_2$ to remove air. The flask was heated to 80° C. with stirring, and dried Novoxzyme-435 beads 2 g were added into the flask to start the reaction. A condenser was added to avoid removal of excess amounts of solvent while slowly purging the flask with $N_2$. The mixture was maintained at 80° C., with magnetic stirring, and occasionally slowly purged with $N_2$ to remove the water generated from the condensation reaction. The reaction was held till there was no more fine water droplets formed, which took about 24 hours. The reaction was terminated by adding an extra 10 mL of anhydrous tert-amyl alcohol, and the enzyme removed while the mixture was still hot by filtration using a 200 μm filter bag to obtain the product in solution. The solvent was evaporated using Genevac evaporator. After a majority of the solvent were evaporated, the sample become phase separated, and the top liquid phase was taken as the final product for characterization and application test.

Example 8: Poly(Glyceryl Adipate Palmitate)

The synthesis process is the same as example 7. But after majority of the solvent were evaporated, the sample became phase separated, and the bottom phase was collected as the final product for characterization and application test.

Part 2: Characterization

The molecular weight averages of selected samples were characterized using GPC. The GPC method is described as below:

Sample Preparation

All samples were prepared in the GPC solvents at ~5 mg/mL. The accurate concentration of each sample was recorded. The samples were shaken for at least 2 hr on a horizontal shaker at ambient temperature to expedite the dissolution process. Prepared samples were filtered using 0.45 μm PTFE filter into autosampler vials before injection. No resistance was observed during filtration process.

Instrumentation

The GPC instrument setup consisted of an Agilent 1100 series HPLC system (degasser, pump, autosampler and UV-Vis detector), and Wyatt T-rEX refractive index detector. ASTRA 7.0.1.24 was used for data acquisition and process.

GPC Conditions

The columns were 2 Agilent PL PolarGel-M (packed with 6 μm particles, 7.5×300 mm) columns. The mobile phase was dimethylacetamide with 50 mM LiBr. The flow rate was 0.5 mL/min. The sample solvent was the same as mobile phase. The sample concentration was ~5 mg/mL. The injection volume of sample solution was 100 μL. The concentration detection was refractive index detector. The column calibration standards were PMMA. The peak molar mass of the narrow standards were 1944000, 790000, 281700, 144000, 79250, 28900, 13300, 5720, 1960, 1020 g/mol, respectively. The SEC peak positions of these PMMA standards were used to construct a third order calibration curve. The obtained PMMA-relative number average molecular weight (Mn), weight average molecular weight (Mw), and polydispersity index (PDI=Mw/Mn) of example polyesters are listed in Table 1.

TABLE 1

The obtained average molecular weights relative to PMMA standards

| Example # | Mn (kg/mol) | Mw (kg/mol) | PDI |
|---|---|---|---|
| 1 | 1.43 | 1.71 | 1.20 |
| 2 | 0.86 | 1.42 | 1.65 |
| 3 | 0.85 | 1.38 | 1.62 |
| 4 | 0.86 | 1.43 | 1.67 |
| 5 | 1.07 | 1.87 | 1.76 |
| 7 | 1.03 | 1.79 | 1.73 |
| 8 | 1.05 | 1.86 | 1.78 |

MALDI analysis also demonstrated the components of the molar mass of these samples are in the similar range (data not shown).

Part 3: Foam Control Performance Evaluation

Potatoes were washed, peeled and sliced. 780 g of sliced potato and 520 g DI water were added into the kitchen mixer and mixed for 1 minute. Potato slurry was generated. The slurry was then filtered through the filter paper and the liquid was collected as foaming medium liquid for performance test, and this foam medium was named as potato liquor.

Similarly, 780 g of peeled sugar beets and 520 g DI water were mixed and filtered for the performance test, and this foam medium was named as sugar beet liquor.

0.5 g of examples 1-8 were added into 99.5 g foam medium. For each example, 100 g of total liquid was obtained for performance evaluation.

For comparison, 100 foam medium without any polyester oligomer was prepared, and labeled as comparative example.

Sparge tube test was utilized to evaluate polyester oligomer foam control property. 100 g of above liquid for each example was added separately into a glass cylinder having a volume of 1000 mL and a diameter of 5 cm. Air grit was placed at the cylinder bottom and air was bubbled from the bottom of the cylinder. Air flow was controlled by Ametek Lo-Flo 0-10 Float Meter with the setting of 1. Foam volumes were recorded during the first 10 minutes after air flow was applied. When foam volume reached to 1000 mL within the first 10 minutes, the experiment was stopped.

Tables 2 and 3 are foam volumes of sugar beet liquor and potato liquor, respectively, with and without polyester oligomer in the function of time. As shown in the tables, for both potato liquor and sugar beet liquor foam mediums, with the presence of polyester oligomer (examples 1-8) in the foam mediums, the foam can be much better controlled than the foam medium without polyester oligomer (comparative example), because for both foam mediums without a defoamer, the foam volume reached to 1000 mL quickly within about 2 minutes.

TABLE 2

Foam control property evaluation for sugar beet liquor

| | Foam volume (mL) | | | | |
|---|---|---|---|---|---|
| | comparative ex | ex 3 | ex 5 | ex 6 | ex 7 | ex 8 |
| 0.5 min | 480 | 80 | 50 | 110 | 90 | 80 |
| 1 min | 600 | 100 | 130 | 120 | 110 | 100 |
| 2 min | | 50 | 150 | 150 | 180 | 170 |
| 3 min | | 150 | 200 | 220 | 240 | 270 |
| 4 min | | 70 | 300 | 260 | 310 | 300 |
| 5 min | | 200 | 400 | 320 | 370 | 310 |
| 6 min | | 160 | 460 | 390 | 440 | 360 |
| 7 min | | 200 | 500 | 440 | 480 | 400 |
| 8 min | | 200 | 530 | 500 | 550 | 410 |
| 9 min | | 200 | 580 | 560 | 630 | 410 |
| 10 min | | 250 | 300 | 560 | 630 | 460 |

TABLE 3

Foam control property evaluation for potato liquor

| | Foam volume (mL) | | | |
|---|---|---|---|---|
| | comparative ex | ex 1 | ex 2 | ex 4 |
| 0.5 min | 320 | 40 | 40 | 10 |
| 1 min | 600 | 100 | 40 | 30 |
| 2 min | | 140 | 70 | 30 |
| 3 min | | 180 | 80 | 50 |
| 4 min | | 220 | 110 | 80 |
| 5 min | | 260 | 110 | 80 |
| 6 min | | 270 | 140 | 110 |
| 7 min | | 280 | 140 | 130 |
| 8 min | | 270 | 140 | 130 |
| 9 min | | 270 | 140 | 160 |
| 10 min | | 270 | 140 | 160 |

What is claimed is:

1. A method for controlling foam while processing a foodstuff, comprising:
   forming a composition comprising a foodstuff and a polyester comprising more than one repeating unit of the Formula I:

wherein $R^2$ is $-(CH_2)_z-$, or and wherein $R^1$ is:

wherein $R^3$ comprises one or more of an ester group(s), a hydroxyl group(s), a group corresponding to repeating unit(s) of Formula I, or a combination thereof; wherein x and z are, independently, integers in the range of 1 to 8; wherein $R^{11}$ is —H, —OH, or comprises one or more repeating unit(s) of Formula I; wherein $R^{12}$ is —C(O)OH, an anhydride, or a salt thereof, or comprises one or more repeating unit(s) of Formula I; and wherein n and m are, independently, integers in the range of 1 to 6; and processing the composition.

2. The method of claim 1 wherein $R^3$ is independently selected from the group consisting of —H, —OH, —O(CO)$R^4$, —(CHR$^5$)$^y$CH$_2$R$^5$, wherein $R^4$ is selected from hydrogen, alkyl, groups comprising one or more of ester, or hydroxyl group(s), and a group corresponding to repeating unit(s) of Formula I; and wherein $R^5$ is selected from H, OH, and a group corresponding to repeating unit(s) of Formula I and wherein y is an integer in the range of 1-8.

3. The method of claim 2 wherein $R^3$ is —O(CO)$R^2$(CO)O$R^6$, and $R^6$ comprises one or more hydroxyl group(s).

4. The method of claim 1 wherein $R^1$ includes one or more hydroxyl groups and one or more hydrocarbyl groups having 6 or more carbon atoms.

5. The method of claim 1 wherein $R^1$ includes two or more of $R^9$, wherein $R^9$ is independently selected from i) —OH, ii) $R^{10}$, wherein $R^{10}$ is O(CO)(CH$_w$)$_y$CH$_3$, wherein w is independently 1 or 2, and y is an integer in the range of 6-20, and iii) a group corresponding to repeating unit(s) of Formula I.

6. The method of claim 1 wherein the polyester has a formula as follows:

wherein $R^7$ is a group comprising one or more carboxylate group(s), or a salt thereof; one or more hydroxyl groups, a hydrocarbyl group, or a combination thereof.

7. The method of claim 1, wherein (a) x is an integer in the range of 1-6, (b) z is an integer in the range of 2-8, or (c) both (a) and (b).

8. The method of claim 1, wherein x is 1, 2, 3, or 4, and z is 4, 5, 6, or 7.

9. The method of claim 1, wherein (a) the polyester has a number of repeating units of Formula I that is n which is an integer in the range of 2-20, (b) the polyester has a weight average molecular weight in the range of 500-50,000 g/mol, or (c) both (a) and (b).

10. A method for controlling foam while processing a foodstuff, comprising:

forming a composition comprising a foodstuff and a polyester, wherein the polyester is formed from reactants comprising (i) a polyol comprising three or more carbon atoms and two or more hydroxyl groups; and
(ii) a diacid or triacid, or an anhydride or salt thereof, having at least four carbon atoms; and processing the composition.

11. The method of claim 10, wherein the polyol has a number of carbon atoms in the range of 3-8, and the diacid, triacid, or anhydride or salt thereof has a total number of carbon atoms in the range of 4 to 10.

12. The method of claim 10 wherein the polyol is a diol, triol, a tetraol, a pentol, a hexol, or a combination thereof.

13. The method of claim 10, wherein (i) the polyol and the diacid, triacid, or anhydride or salt thereof are at a molar ratio in the range of 3:1 to 1:3, (ii) (a) the polyol and the diacid, triacid, or anhydride or salt thereof, or (b) polyol, diacid, triacid, and a monofunctional fatty acid, are present in the composition in an amount of 90% or greater (molar) of the reactants, or (iii) both (i) and (ii).

14. The method of claim 10, wherein (a) the polyol is selected from the group consisting of glycerol, erythritol, threitol, arabitol, ribitol, sorbitol, xylitol, mannitol, allitol dulcitol, galactitol, and iditol, (b) the diacid or triacid comprises a diacid or anhydride or salt thereof selected from the group consisting of malonic acid, succinic acid, glutaric acid, adipic acid, pimelic acid, and suberic acid, and anhydrides and salts thereof, or (c) both (a) and (b).

15. The method of claim 10, wherein the polyester is formed from reactants further comprising a monofunctional fatty acid having 6 or more carbon atoms or a monofunctional fatty alcohol having 6 or more carbon atoms.

16. The method of claim 1 wherein the polyester is present in an amount in the range of 0.01 to 5% (wt) in the composition.

17. The method of claim 1 wherein the foodstuff is or derived from a vegetable selected from the group consisting of peas, corn, potatoes, beans, rice, wheat, cassava, beans, sweet potatoes, yams, sorghum, plantain, beets, chickpeas, soya beans, alfalfa sprouts, navy beans, haricot beans, and kidney beans.

18. The method of claim 1, wherein processing comprises
(a) washing the foodstuff;
(b) one or more of the following actions selected from the group consisting of cutting, chopping, grating, slicing, peeling, julienning, mincing, dicing, diffusing, and shredding;
(c) one or more of blending, pureeing, beating, liquidizing, mashing, whisking, crushing, juicing, and grinding;
(d) crystalizing or purifying;
(e) fermenting; or
(f) any combination of (a)-(e).

19. A food product precursor composition comprising a foodstuff; and
a polyester as described in claim 1.

20. A system for processing a foodstuff according to the method of claim 1 comprising:
(a) a foodstuff processor capable of one or more of washing, cutting, chopping, grating, slicing, peeling, julienning, mincing, dicing, shredding, blending, pureeing, beating, liquidizing, mashing, whisking, crushing, juicing, grinding, and fermenting a foodstuff to a processed foodstuff;
(b) the polyester according to claim 1;
(c) a container configured to hold the polyester and the processed foodstuff, and
(d) a separator mechanism capable of separating the polyester from the processed foodstuff.

* * * * *